Jan. 27, 1970 R. B. BRUNDAGE 3,492,455
COMBINATION ARC AND RESISTANCE SPOT WELDER
Filed Dec. 5, 1966 3 Sheets-Sheet 1
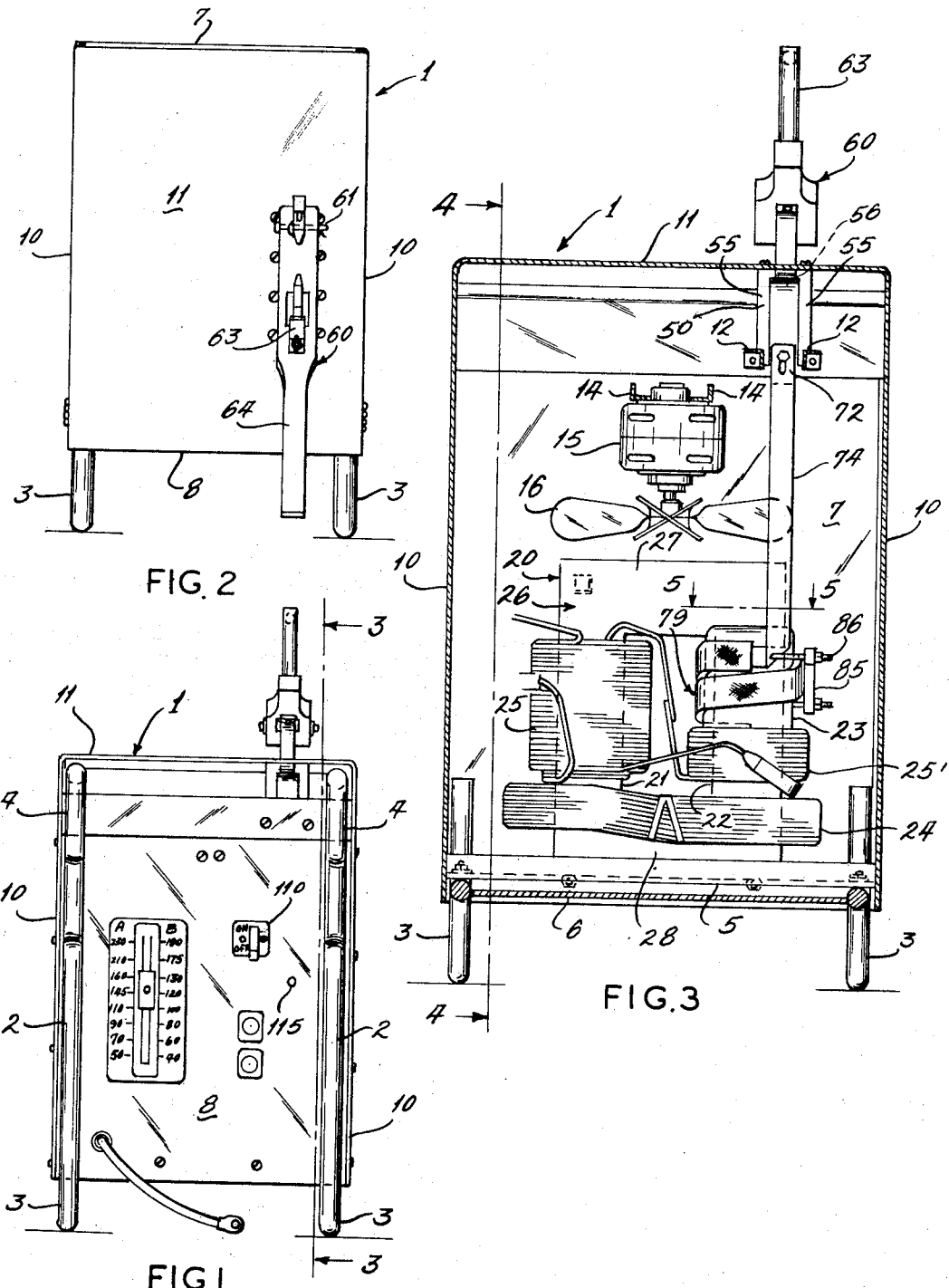
INVENTOR:
RICHARD B. BRUNDAGE
BY
ATTORNEY,

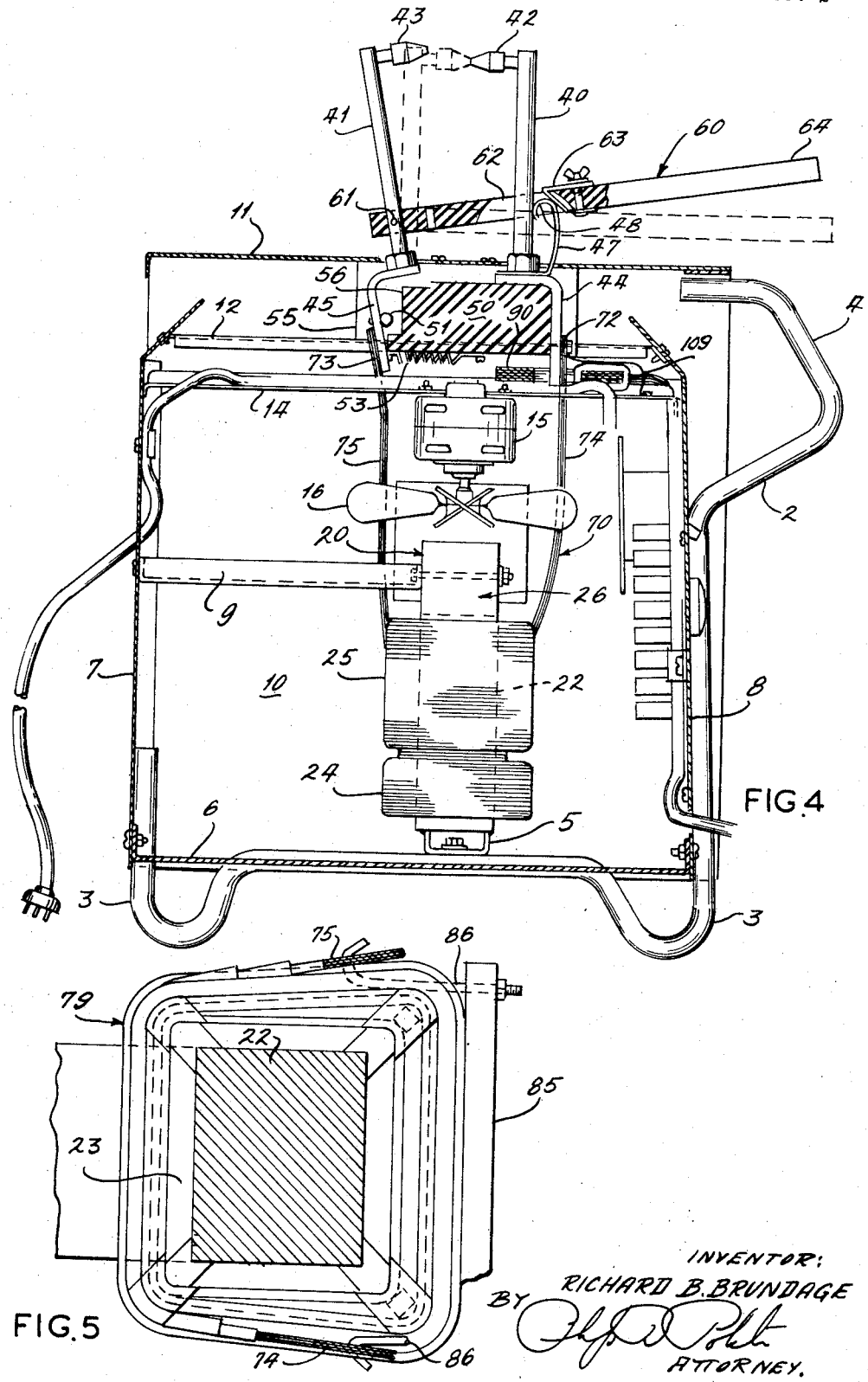

Jan. 27, 1970   R. B. BRUNDAGE   3,492,455
COMBINATION ARC AND RESISTANCE SPOT WELDER
Filed Dec. 5, 1966   3 Sheets-Sheet 3
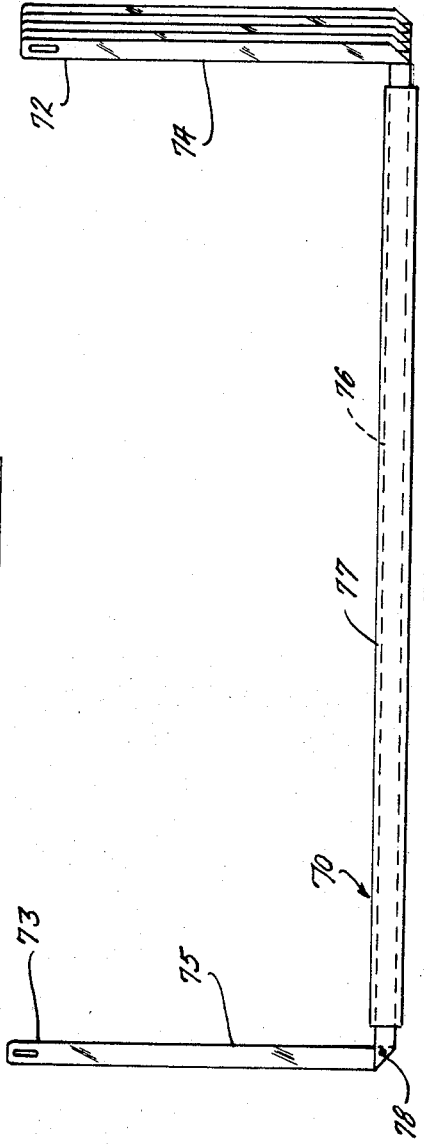
FIG.6
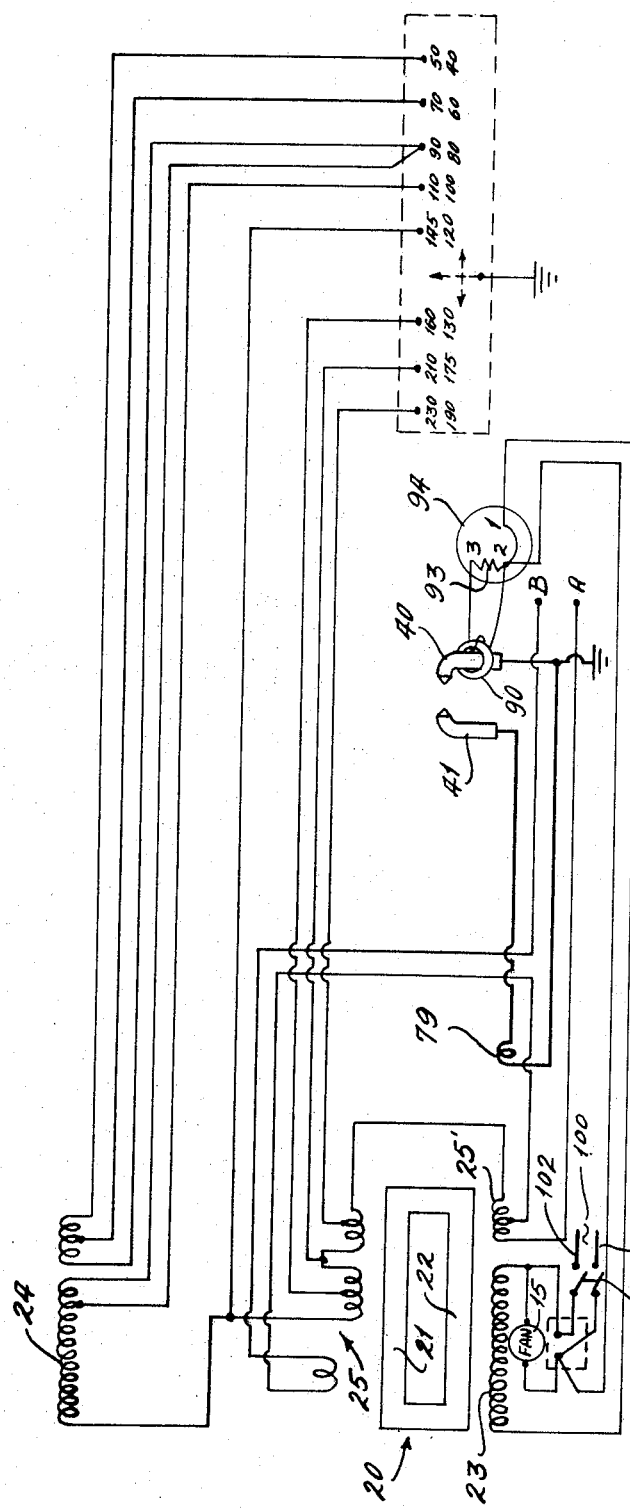
FIG.7
INVENTOR:
RICHARD B. BRUNDAGE
BY
ATTORNEY United States Patent Office 3,492,455
Patented Jan. 27, 1970

3,492,455
COMBINATION ARC AND RESISTANCE SPOT WELDER
Richard B. Brundage, Ladue, Mo., assignor to Emerson Electric Co., St. Louis, Mo., a corporation of Missouri
Filed Dec. 5, 1966, Ser. No. 599,082
Int. Cl. B23k 9/10, 11/24
U.S. Cl. 219—116                           6 Claims

ABSTRACT OF THE DISCLOSURE

A combination arc and resistance spot welder with an arc welding transformer with a resistance spot welding secondary winding closely wound about a primary winding common to both the arc welding and spot welding circuits. A spot welding secondary winding made up of multiple wide, thin conductors with sufficient flexibility to permit direct electrical and mechanical connection to a movable electrode holder. A thermal protector element in the spot welding secondary circuit the operation of which is independent of the arc welding secondary. A single on-off switch common to both arc and spot welding circuits. Spot welding electrodes mounted on the same chassis as an arc welder.

Background of the invention

This invention relates to electric welders, and in particular to a combination arc and resistance spot welder.

Arc welders and resistance spot-welders have existed separately for many years. Spot-weld "gun" attachments to arc welders have been known heretofore, but they have used the relatively low amperage available from the secondary of an arc welder to heat carbon electrodes and are, accordingly, not true resistance spot welders.

One of the objects of this invention is to provide a combination arc and true resistance welder which is compact, economical and effective.

Other objects will become apparent to those skilled in the art in the light of the following description and accompanying drawing.

Summary of the invention

In accordance with this invention, generally stated, a combination arc and resistance spot-welder is provided which utilizes the laminated frame and primary winding of an arc-welding transformer to produce a high current low voltage source for resistance welding. To this end, at least a portion of the primary winding is made free of embracement by the arc-welding secondary winding, and a spot-welding secondary winding is closely wound around the primary winding in a portion of the primary winding free of embracement by the arc welding secondary winding. In the preferred embodiment, the spot welding secondary winding comprises a plurality of superposed, thin, wide, electrically conductive strips. In the illustrative embodiment shown, the ends of the strips, aligned to form a composite conductor, are attached, at one end of the conductor, to a fixed spot-welding electrode, and at the other end of the conductor, to a movable spot welding electrode. The use of the bundle of thin wide strips provides sufficient flexibility to eliminate the necessity for a separate flexible connection between the conductor serving as the spot-welder secondary and the movable electrode. In the preferred embodiment, the welder transformer is mounted on a chassis or frame, and the spot-welding electrodes are mounted on the same frame structure, above the transformer.

Also in the preferred embodiment, an on-off switch is provided in a line between a source of alternating current and the primary winding whereby the arc-welding secondary and spot welding secondary winding are energized and de-energized at the same time by the operation of the on-off switch. A spot welding circuit thermal protector is provided. In the illustrative embodiment shown, a pilot transformer is provided in the spot-welding secondary circuit, which is coupled to a heater in a thermal protector in the line from the source of alternating current to the primary winding.

Brief description of the drawing

In the drawing, FIGURE 1 is a view in front elevation of one illustrative embodiment of welder of this invention;
FIGURE 2 is a top plan view of the welder shown in FIGURE 1;
FIGURE 3 is a sectional view taken along the line 3—3 of FIGURE 1;
FIGURE 4 is a sectional view taken along the line 4—4 of FIGURE 3;
FIGURE 5 is a sectional view taken along the line 5—5 of FIGURE 3;
FIGURE 6 is a view in side elevation of a conductor, before its installation in the welder, in the form of a multiplicity of superposed, wide, thin, electrically conductive strips, which, in the illustrative embodiment shown, serves to form both the spot welding secondary winding and leads to the spot welding electrodes; and
FIGURE 7 is a circuit diagram showing the electrical system of the illustrative embodiment of welder of this invention shown in FIGURES 1–5.

Description of the preferred embodiment

Referring now to the drawings, reference numeral 1 indicates one illustrative embodiment of a combination arc and resistance spot welder of this invention. The welder 1 has a frame or chassis which includes a pair of tubular side members 2 which are bent to form feet 3 and handles 4. The side members 2 are joined by a heavy base channel 5, which is bolted to the center span of the side members 2, between the feet 3 of each side member. A heavy expanded metal bottom 6, is bolted to a rear panel 7 and a front panel 8. The rear panel 7 is bolted to a brace 9, and to side panels 10 which are integral with a top 11. The front panel 8 is bolted to the side members 2 and to side panels 10. Both the front and rear panels are provided with inwardly bent sections the upper edges of which are spaced from the top 11 to define air passages near the upper end of the welder, as shown particularly in FIGURE 4.

A pair of spaced parallel angles 14 extend between and are bolted to the front and rear panels 8 and 7, as shown in FIGURE 4. A fan motor 15 is bolted to the angles 14, with its shaft extending vertically downwardly and blades 16 are mounted on the shaft.

A transformer 20, which, in this embodiment has a laminated so-called core type frame 26, is welded to the legs of the base channel 5. The frame 26 has side legs 21 and 22 and connecting legs 27 and 28. A primary winding 23 is wound around the leg 22. A choke coil 24 is mounted on and outboard of the core 20 around the connecting leg 28, and an arc welding secondary (reactor) winding 25 is wound around and through most of the reach of the leg 21. A vertically short coil 25' of arc welding secondary winding is wound around the lower part of the leg 22, leaving a substantial vertical reach of primary winding 23 unembraced by the secondary winding 25'. Suitable welding taps are provided, and a selector switch, with appropriate indicia on the front panel, as shown in FIGURE 1, to permit the desired amperages to be selected for arc welding. It will be observed from FIGURES 1 and 7 that these amperages range from 40 to 230 amps, in a commercial model here illustrated. The voltage ranges from about 50 to 77 volts.

The construction described thus far is and has for some time past been a standard construction for arc welders manufactured by Emerson Electric Co., except for the short vertical reach of secondary coil 25'. The electrical aspects of this construction are described in Royer and Jost U.S. Patent 3,237,090.

A pair of spaced, parallel, angle irons 12 extend between and are bolted at their ends to the inwardly bent sections of the front and rear panels, as shown in FIGURES 3 and 4. The channels 12 are off-set from the vertically central line of the front and rear panels toward the outboard edge of the leg 22 of the transformer as shown in FIGURE 3. Particularly during assembly of the welder, the channels 12 support a block 50 of electrically insulating material such as hard wood. The block 50 illustrated has side walls 55, rabbeted at their lower edge to fit between and rest on the angle irons 12 and flat on their top edge to butt the underside of the top 11, and an intermediate section 56. A heavy, copper, fixed, L-shaped spot welder electrode post bracket 44 is fastened securely to the section 56. A heavy, copper, L-shaped, movable spot welder electrode post bracket 45 is hingedly mounted between the walls 55 by means of a horizontal shaft 51 journaled in and extending between the two walls as shown in FIGURE 4. As shown in the same figure, a helical spring 53 is fastened at one end to the underside of the intermediate section 56, and connected at its other end to the lower end, projecting below the section 56, of the post bracket 45. Spot welder electrode posts 40 and 41 are mounted on the post brackets 44 and 45 respectively. The electrode posts 40 and 41 project through an elongated opening in the top 11, and the top is screwed tightly to the flat top edge of the walls 55 adjacent the opening, as shown in FIGURES 2, 3 and 4. The spot welder electrode posts 40 and 41 have spot welding electrodes 42 and 43, respectively, physically and electrically connected to them in facing relation, as shown in FIGURES 2 and 4. The spring 53 biases the electrode post 41, hence the electrode 43, in a direction away from the post 40 and the electrode 42. In the illustrative embodiment shown, a spot-welding operative handle 60 made of electrically insulating material, is hinged at one end to the post 41, by means of a hinge pin 61, as shown particularly in FIGURE 2. The handle 60 has a relativley wide section, in which an opening 62 is provided to accommodate the post 40 and to permit the handle to rotate about the hinge pin 61, and to be translated as well. An adjustable cam cap 63 at one edge of the opening 62 bears on a camming spring 47. The camming spring 47 is fixed at one end to the bracket 44 between a nut on the post 40 and the top of the bracket, extends vertically in a shallow arc, and terminates at its upper end in a crook 48 which bears against the post 40, as is best shown in FIGURE 4. The handle 60 has a grip portion 64 proportioned to make grasping easy.

Mechanically and electrically connected to the brackets 44 and 45 respectively are ends 72 and 73 of a composite conductor 70. The conductor 70, in the embodiment shown, makes two turns about the inside face of the leg 22 of the transformer core 20, closely around the part of the primary winding 23 which is free of embracement by the coil 25'. These two turns constitute a spot weld secondary winding 79 which provides a high current low voltage in-phase output. In the illustrative embodiment described, the output is rated at forty three hundred amps at two and six tenths volts under short circuit conditions. The conductor 70 is made up of a plurality (in this embodiment five) of thin, wide, conductive strips. Merely by way of illustration, in the embodiment shown, the strips making up the conductor 70 are copper, one inch wide and one-thirty second of an inch thick, with a reach between the coil and the bracket of the order of ten to twelve inches, which provide the flexibility needed to accommodate the rocking of the movable electrode.

As indicated in FIGURE 6, before the conductor 70 is installed, the strips are of graded length, and each is given two right angle bends to form a central coil forming span 76 and connecting straps 74 and 75. The strips are then assembled, with the straps 75 aligned and the straps 74 offset from one another preparatory to winding. An insulating sleeve 77 embraces most of the center span 76 between the straps 74 and 75, and marks the coil area of the conductor. The strips are punched to provide elongated holes in the ends 72 and 73, and a round hole 78 in the double thickness at the bend at the strap 75. The strips are held against movement at the strap end 75, so as to maintain their alignment during the winding of the conductor 70 about the primary 23, but the remaining part of the strips is free to move with respect to contiguous strips. The winding proceeds with the shortest strip on the inside, and the length of the strips is such that, after the conductor 70 is wound, the strips at the strap end 74 are all aligned. They are then drilled to form a hole 78 at the bend. An anchor bar 85, with hooks 86, projecting through the holes 78, as indicated in FIGURE 5, holds the winding 79 in place. The ends 72 and 73 are then firmly connected mechanically and electrically to the brackets 44 and 45 respectively. A ground wire 109 is electrically connected to the electrode bracket 46 and strap 74 at one end and to the chassis by way of the channel 14 at the other.

A pilot transformer, in the form of a ring of laminations 90 surrounding the end of the strap 74 at the lower end of the fixed bracket 42 has on it a few turns of wire, for example eight, the two ends of which form leads which are connected to a heater 93 in a thermal protector 49 connected into one of two power lines 101 and 102 from a source 100 of alternating current as shown in FIGURES 4 and 7. The protector 94 is mounted on the inside of the front panel 8 and has a reset button 115 projecting through a hole in the front panel as shown in FIGURE 1. In the illustrative embodiment shown, the source 100 provides two hundred twenty volts across lines 101 and 102.

The details of the electrical circuit are best shown in FIGURE 7. As is indicated, a master switch 110 is positioned in the lines 101 and 102 from the source of current 100, so that operation of the switch 110 energizes and de-energizes the primary winding which in turn energizes and de-energizes both the arc welding and the spot welding circuit.

In operation for purposes of arc welding, the on-off switch is turned to "off," suitable arc welding cables are connected in the usual way, an arc welding electrode is put in a holder on one cable and the other is connected to the work piece, the on-off switch is turned on, and the arc-welding is accomplished in the expected manner.

For spot welding, the handle 60 is initially and normally in the position shown in full lines in FIGURE 4, and the on-off switch is in the "off" position. The work pieces to be joined are put between the electrodes 42 and 43, the handle is pushed down, so that the camming effect of the cam cap 63 and spring 47 moves the electrode 43 against one side of the work piece and holds the work piece tightly against the electrode 42. The on-off switch is then moved to the "on" position and left there for a time sufficient to make the weld, and is then moved to the "off" position. The handle 60 is then raised, to release the welded work piece, and the work piece is moved or removed. If the electrodes 42 and 43 are accidentally shorted directly or the work piece is left too long between them, the current generated in the coil of the pilot transformer 90 causes the heater 93 to act on a bimetallic strip or disc of the protector 94 and acts to break the primary circuit.

The welder of this invention is designed to be used in only one capacity at a time i.e. either as a spot welder or as an arc welder, but not both at once. While the device could be built to operate in both capacities simultaneously, the size of the transformer frame and primarily required would negative the advantage of the illustrative embodiment shown and described.

Numerous variations in the construction of the welder of this invention, within the scope of the appended claims, will become apparent to those skilled in the art in the light of the foregoing disclosure.

For example, the transformer can be made with a shell type frame and various arrangements of reactor and choke coil, as suggested in the Royer and Jost Patent 3,237,090 to which reference has been made. Various other types of mounting and clamping arrangements, besides the particular form of block 50 and handle 60 may be used. These are merely illustrative.

Having thus described the invention, what is claimed and desired to be secured by Letters Patent is:

1. A combination arc and spot-welder comprising a low-current arc-welding circuit including a transformer having a core, primary winding with a multiplicity of turns on said core and adapted to be connected to a source of alternating current, an arc-welding secondary winding with a multiplicity of turns on said core and connections adapted to connect electrically said secondary winding to arc-welding electrodes, at least a portion of said primary winding being free of embracement by said arc-welding secondary winding, and a spot-welding circuit including a secondary winding closely wound around said primary winding in a portion of said primary winding free of embracement by said arc-welding secondary winding, said spot-welding secondary winding being electrically connected to spot-welding electrodes.

2. The combination of claim 1 wherein the spot-welding secondary winding comprises a plurality of superposed, thin, wide, electrically conductive strips.

3. The combination of claim 1 wherein an on-off switch is provided in a line between a source of alternating current and the primary winding whereby both the arc-welding secondary and spot-welding secondary windings are energized and de-energized at the same time by the operation of the on-off switch.

4. The combination of claim 1 wherein a thermal protector is connected to operate in response to a prolonged passage of current through the spot welding circuit to disconnect the primary winding from a source of alternating current.

5. The combination of claim 4 wherein a pilot-transformer is provided in the spot-welding secondary circuit and is coupled to a heater in a thermal protector in the line from the source of alternating current to the primary winding.

6. The combination of claim 1 wherein the welder includes a chassis on which the transformer is mounted and the spot welding electrodes are mounted on said chassis above the transformer.

References Cited

UNITED STATES PATENTS

| | | | |
|---|---|---|---|
| 2,749,417 | 6/1956 | Griskell | 219—90 |
| 2,909,647 | 10/1959 | Glenn et al. | 317—40 |
| 2,961,527 | 11/1960 | Tortorella | 219—90 |
| 3,058,031 | 10/1962 | Steinert et al. | 317—40 |
| 3,059,170 | 10/1962 | Jetter | 336—184 |
| 3,237,090 | 2/1966 | Royer et al. | 323—45 |
| 3,278,833 | 10/1966 | Owen | 219—116 |
| 3,396,261 | 8/1968 | Kirsch | 219—90 |

JOSEPH V. TRUHE, Primary Examiner
W. DEXTER BROOKS, Assistant Examiner